(No Model.)

E. P. USHER.
STORAGE BATTERY.

No. 480,883. Patented Aug. 16, 1892.

Witnesses
Thomas W. Hobday.
George T. Butterfield

Inventor
Edward P. Usher
by A. N. Spencer
Attorney

THE NORRIS PETERS CO., PHOTO-LITHO., WASHINGTON, D. C.

UNITED STATES PATENT OFFICE.

EDWARD P. USHER, OF GRAFTON, MASSACHUSETTS, ASSIGNOR TO THE HOPEDALE ELECTRIC COMPANY, OF WEST VIRGINIA.

STORAGE-BATTERY.

SPECIFICATION forming part of Letters Patent No. 480,883, dated August 16, 1892.

Application filed August 22, 1891. Serial No. 403,427. (No model.)

*To all whom it may concern:*

Be it known that I, EDWARD P. USHER, of Grafton, in the county of Worcester and State of Massachusetts, have invented certain new and useful Improvements in Storage-Batteries, of which the following, taken in connection with the accompanying drawings, is a specification.

The object of this invention is to simplify and cheapen storage-batteries and at the same time to increase their durability and efficiency, while providing for the restoration of any part and for the portability of the whole.

A peculiarity of my invention is the facility with which the battery-cell may be built up from a series of detached parts adapted to fit together and when inserted in place to be held with a yielding grip providing for incidental expansion. The bottom and sides of the battery elements are inclosed by a flexible wrapper of vulcanized-rubber compound or the like, upon the surface of which inclined yielding lips are formed with a grooved space between adjacent lips to receive the edge of the lead plate or frame and to hold such frame in its normal vertical position. The lips of each pair separate at the apex or line of meeting of their inclined surfaces to receive the edges of a non-conducting separator-sheet, interposed between the successive positive and negative plates, so that each plate is in a narrow pocket or chamber, and is held at its edges by the yielding lips and is shielded by the separators similarly held, so that any active material which may crumble may not come into contact with the opposite plate. The battery-plates are cast as a thin sheet with a series of vertical ribs, flanges, or stiffeners projecting on opposite sides, between which ribs the active material is introduced, intermediate wells or spaces being preferably left open for more free circulation. The active material is in the form of tablets, which may be introduced endwise after the plates and separators are in place. I prefer to form these tablets by wrapping the proper amount of dry active material in an envelope of thin lead-foil, then flattening and perforating the envelope; but the material may be molded stiff and the envelope omitted, or it may be filled in in powdered form into the spaces between the plates and separators.

Figure 1:
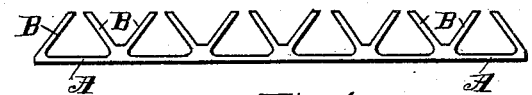
Figure 2:
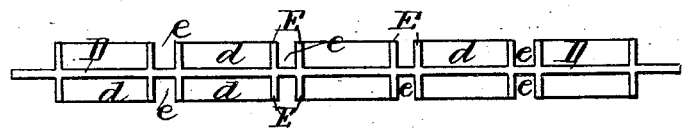
Figure 3:
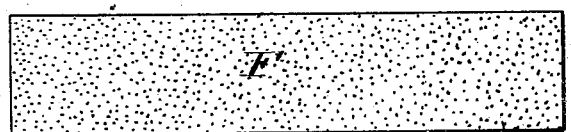
Figure 4:
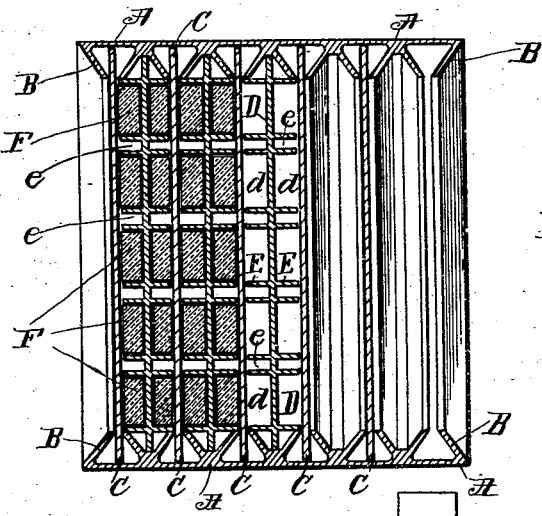
Figure 5:
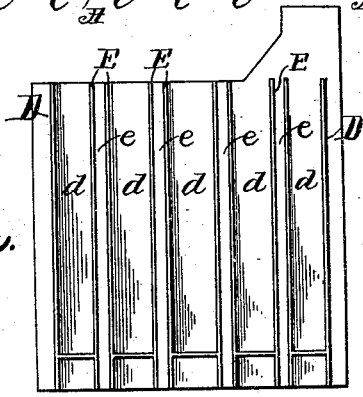

In the drawings, Figure 1 is a transverse section of the flexible wrapper, showing the inclined lips formed thereon. Fig. 2 is a top plan of my ribbed or flanged plate or frame prepared to receive the tablets of active material. Fig. 3 represents one of the tablets with its wrapping of perforated lead-foil. Fig. 4 is a horizontal section through a cell made up according to my invention, and showing the several parts in proper position, two pockets being shown vacant and one having the metallic plate without the tablets. Fig. 5 is a side view of one of the flanged plates.

A marked peculiarity of my improved battery, illustrated in Figs. 1 and 4, will be first described.

A flexible wrapper A, of rubber compound, is made of such size as to cover the bottom and both ends of the series of battery plates or elements. This wrapper has at proper intervals upon its surface a series of parallel lips B, arranged in pairs inclined toward each other and extending from end to end of the wrapper, so as to hold in place between the lips of each pair a separator-sheet C and to permit a yielding movement to each sheet within certain limits. The battery-plates D alternate with said sheets and occupy with their edges the spaces between adjacent pairs of lips and with their bodies the pockets between adjacent separators so held. The walls of such pockets are therefore somewhat yielding to provide for the expansion incidental to the ordinary use of the battery.

The separator-sheets C, made of some porous non-conducting material, such as wood or earthenware, are introduced edgewise between the two lips of each pair, which incline inwardly toward such separator, so as to press gently against its surfaces near its bottom and its two vertical edges. The series of lips will be notched in transverse lines where the flexible wrapper turns up to inclose the ends of the plates D and separators C, thus making good miter-joints of the lips at the lower corners of the plates.

Another feature of my invention is embodied in the construction shown in Figs. 2 and 5. The lead plates D are cast thin with stiffening-flanges E on opposite sides at intervals, leaving broad spaces $d$ and narrow spaces $e$ between them about as represented. The broad spaces are to receive tablets F of active material, while the narrow spaces $e$ constitute open vertical wells or shafts, which permit the escape of gases, carry the liquid quickly to all parts of the plate, allow it to be agitated to equalize its density, or to be drawn off for the purpose of testing its specific gravity.

The tablets F are also peculiar to my invention. These tablets, formed of red lead or other lead oxide, are molded, pressed, or stamped into the proper size and shape to fit into the spaces $d$ on the sides of the plates D, prepared to receive them. I prefer to form these tablets of said material in a dry ground or powdered state inclosed in an envelope of very thin lead-foil finely perforated, as in Fig. 3, and flattened to fit into place. To prevent the powder from sifting out, I may coat the exterior of the tablet with mucilage or like substance, which will temporarily close the perforations, but will dissolve when exposed to the acid in the use of the battery. Having these various articles at hand, a cell may be constructed with the utmost ease and rapidity. Taking the flexible wrapper A, a separator C is inserted between the lips B of the first pair. Against this separator the first lead plate D E is placed with its lower edge in the groove between the first and second pair of lips. Another separator is then inserted between the lips of the second pair, followed by another plate, the positive and negative plates thus alternating and separated by the sheets C until the desired size of cell is reached. Then the side pieces of the wrapper A B are adjusted to the ends of the separators C and plates D, and the entire cell is bound together by means of a rubber band or otherwise. It is obvious that the sides may be first turned up and suitably held, and the successive separators introduced edgewise between the side and bottom lips, and the plates inserted into the pockets thus formed to receive them. I thus have a skeleton cell which is completed and made ready for charging by slipping a prepared tablet F into each of the spaces $d$ and electrically connecting the several positive plates and negative plates, the cell then presenting the appearance in section. (Shown at the left side of Fig. 4.) The tablets rest upon a horizontal flange (shown in Fig. 5) near the bottom of the plate, where the recesses $d$ terminate. The wells $e$ extend to the bottom of the plate, as seen in the same figure; but the vertical flanges E need not extend below said horizontal flange.

I claim as my invention—

1. In a storage-battery, a flexible wrapper for the series of plates, such wrapper having inwardly-projecting inclined lips to hold the separator-sheets and lead plates in proper alternate position, substantially as set forth.

2. In a storage-battery, the flexible wrapper of rubber compound with yielding inclined lips thereon, in combination with the positive and negative plates and the separators thereby held in position, substantially as set forth.

3. The receptacle lined with rubber, having yielding lips with inclined surfaces, in combination with the alternate plates and the interposed separators, substantially as set forth.

4. The flexible wrapper having yielding inclined lips in parallel rows and the separator-sheets held thereby, in combination with the leaden plate or frame formed with projecting ribs or flanges and with active material introduced into the space between said flanged frame and separators, substantially as set forth.

5. In a storage-battery, flanged plates or frames combined with active material in tablet form and with interposed separators, substantially as set forth.

6. In a storage-battery, a tablet of active material enveloped in lead-foil, substantially as set forth.

7. In a storage-battery, a tablet of active material enveloped in lead-foil finely perforated, substantially as set forth.

8. In a storage-battery, the flanged leaden plate D E, having lateral spaces for active material, and open vertical wells separating the same, substantially as set forth.

9. A storage-battery cell comprising the following detachable parts, viz: a flexible wrapper having yielding lips, separators held by such lips, flanged plates alternating with said separators, tablets of active material between such plates and separators, all adapted to be placed within the receptacle inclosing such parts with the electrolytic liquid, substantially as set forth.

In testimony whereof I have signed my name to this specification, in the presence of two subscribing witnesses, on this 19th day of August, A. D. 1891.

EDWARD P. USHER.

Witnesses:
A. H. SPENCER,
J. C. KENNEDY.